United States Patent [19]

Yaegashi et al.

[11] Patent Number: 5,956,453
[45] Date of Patent: Sep. 21, 1999

[54] METHOD OF EDITING MOVING IMAGE AND APPARATUS OF EDITING THE SAME

[75] Inventors: Kazuhito Yaegashi, Kodaira; Hirotada Ueda, Kokubunji, both of Japan

[73] Assignee: Hitachi Denshi Kabushiki Kaisha, Tokyo, Japan

[21] Appl. No.: 08/826,975

[22] Filed: Apr. 9, 1997

[30] Foreign Application Priority Data

Apr. 12, 1996 [JP] Japan ................................... 8-091420

[51] Int. Cl.$^6$ ....................................................... H04N 5/76
[52] U.S. Cl. ............................... 386/52; 386/111; 386/95
[58] Field of Search ........................... 386/52, 111, 112, 386/83, 121, 95; 358/906; 352/129; 707/514; H04N 5/76

[56] References Cited

U.S. PATENT DOCUMENTS

| | | | |
|---|---|---|---|
| 5,177,513 | 1/1993 | Saito | 352/129 |
| 5,204,706 | 4/1993 | Saito | 252/129 |
| 5,541,738 | 7/1996 | Mankovitz . | |
| 5,546,191 | 8/1996 | Hibi et al. | 386/83 |

FOREIGN PATENT DOCUMENTS 4-207877  7/1992  Japan ............................. H04N 5/78

OTHER PUBLICATIONS

Y. Tonomura and S. Abe, "Content Oriented Visual Interface Using Video Icons for Visual Database Systems", *Journal of Visual Languages and Computing; Academic Press*, pp. 183–198 (1990).

*Primary Examiner*—Huy T. Nguyen
*Attorney, Agent, or Firm*—Antonelli, Terry, Stout & Kraus, LLP

[57] ABSTRACT

A method of editing an image with the aid of a computer while watching moving image information displayed on a screen includes a step of selecting still images representing a plurality of video scenes or a plurality of video cuts constituting the moving image information, a step of determining a hierarchical structure among a plurality of scenes and a plurality of cuts represented by still images, a step of designating static images related to an optional hierarchical structure portion in the hierarchical structure, and a step of displaying the hierarchical portion including designated still images on a screen with such an arrangement that shows the hierarchical structure. An apparatus for editing a moving image for editing an image with the aid of a computer while watching moving image information displayed on a screen includes a recording apparatus for recording moving image information, a change point detection segment for comparing adjacent frame images with each other, and recognizing that, when information is changed exceeding a predetermined quantity between adjacent frame images, the adjacent frame images are frame images belonging to different cuts, reduced images obtained from frame images constituting respective cuts and information for identifying the cuts being recorded in the recording apparatus, a control segment for generating information for identifying scene images by putting a plurality of predetermined cuts together as scene images, generating information for identifying a motion picture by collecting a plurality of predetermined scenes as a motion picture, and determining a hierarchical structure among the scenes and cuts represented by said reduced images in accordance with the selection of reduced images representing a plurality of video scenes or a plurality of video cuts constituting moving image information, a designation segment for designating reduced images related to a predetermined hierarchical structure portion in the hierarchical structure, and a display monitor for showing a hierarchical portion including designated reduced images with such an arrangement as to show the hierarchical structure.

13 Claims, 11 Drawing Sheets

METHOD OF EDITING MOVING IMAGE AND APPARATUS OF EDITING THE SAME

BACKGROUND OF THE INVENTION

The present invention relates to a method of editing a moving image and an apparatus therefor with the aid of a computer used at the time of producing a moving image such as production of television broadcasting programs, production of video programs or the like. In those installations that are used for arranging television broadcasting programs and video programs, achievement of high functions by using a computer is being developed rapidly. In particular, an apparatus for editing a moving image for editing image information stored in a large-capacity random access storage device such as a hard disk which is inexpensive and easy for handling and conservation with the aid of computer is available in recent years in place of such a method of editing an image that rapid traverse and rewind are repeated by the help of a tape counter by means of a video tape recorder.

In JP-A-4-207877, a moving image management apparatus for editing a moving image in the unit of scene or cut is disclosed. In this apparatus, a hierarchical structure of cuts and scenes is displayed on a screen in a tree structure form.

When edit of a plurality of cuts is proceeded using a tree structure (a hierarchical structure), however, all of edit states become no longer displayed completely due to the limit in point of resolution of a monitor screen. In this case, a user has to confirm the display contents by scrolling them, thus causing such a drawback that the operation becomes complicated and the contents are difficult to be grasped.

SUMMARY OF THE INVENTION

According to the present invention, such a drawback that, when, for example a user confirms the whole edit state in case moving images are stored in a tree structure (a hierarchical structure) of a plurality of scenes and cuts, managed and displayed as described above in order to search for required scenes and cuts easily, the user has to confirm while operating a scroll bar of a window displaying the tree structure with a mouse is removed or decreased.

A method of editing a moving image with the aid of a computer while watching moving image information displayed on a screen includes a step in which a plurality of reduced still images representing a video scene or a video cut constituting moving image information is selected, a step in which a hierarchical structure among still images is determined, a step in which still images related to an predetermined hierarchical structure portion in the hierarchical structure is designated, and a step in which a hierarchical portion including the designated still images is displayed with such a hierarchical arrangement.

A recording medium for storing program codes read and executed by a computer according to the present invention stores a first code section representing a procedure for determining a hierarchical structure among the still images in accordance with the selection of a still image representing a video scene or a video cut constituting moving image information, and a second code section representing a procedure for displaying with such an arrangement that a hierarchical portion including designated still images that expresses the hierarchical structure in accordance with that still images related to a predetermined hierarchical structure portion in the hierarchical structure are designated.

An apparatus for editing a moving image with the aid of a computer while watching moving image information displayed on a screen according to the present invention includes a recording apparatus for recording the moving image information, a change point detection segment for detecting a change point of a moving image comparing adjacent frame images with each other and recognizing that the adjacent frame images are frame images belonging to different cuts when the information changes beyond a predetermined quantity of the information difference between adjacent frame images, a recording segment for recording reduced still images obtained by reducing data quantity of frame images forming respective cuts and information or reduced image display file for indicating reduced still images representing the cuts, a control segment for generating information for identifying a scene by putting a plurality of predetermined cuts together as a scene, generating information for identifying a moving image by putting a plurality of predetermined scenes together as a moving image or a motion picture, and determining a hierarchical structure among image scenes and image cuts represented by reduced still images in accordance with the selection of a reduced still image representing a scene or a video cut constituting moving image information, a designating segment for designating reduced still images related to an predetermined hierarchical structure portion in the hierarchical structure, and a monitor for making graphic expression with such an arrangement that the hierarchical portion including the designated reduced still images show the hierarchical structure.

DESCRIPTION OF THE PREFERRED EMBODIMENTS

It is conceived better to explain a data structure of recorded moving image information which is the object of editing with reference to the drawings prior to starting explanation of an editing apparatus and editing operation of a moving image according to the present invention.

Figure 8:
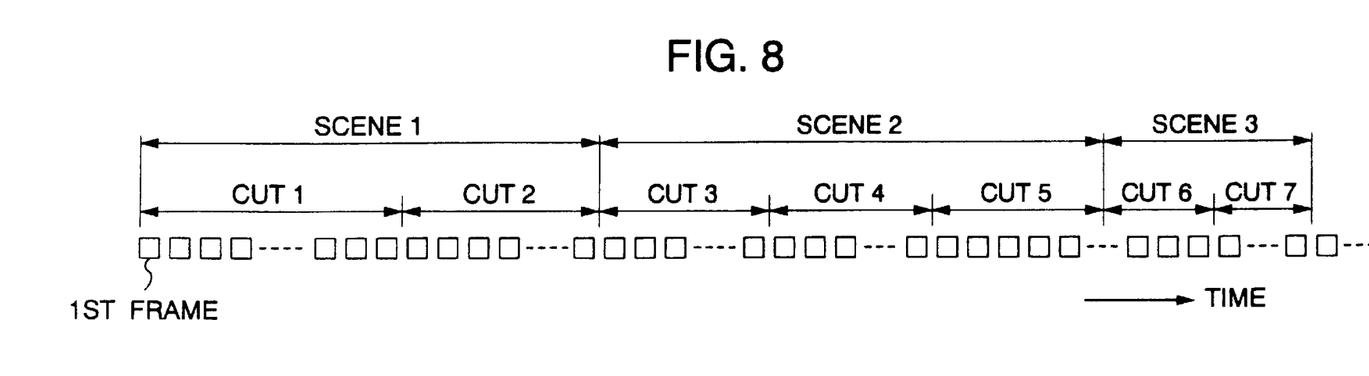
FIG. 8 is a typical diagram for explaining an example of a data structure of recorded moving image information.

In FIG. 8, a frame image array constituting a recorded video source is displayed typically as a time series arrangement. The image data of a video source recorded on a magnetic tape are generally arranged in such a form. In a magnetic disk and an optical disk, the image data are not necessarily recorded in such a time series arrangement physically, but another data arrangement is made. Since it is possible to make access to any recorded image data in almost the same time in a disk-shaped recording medium, such recording medium is advantageous.

A "cut" is defined as a set of frame images picked up from the start to the end of photographing operation one time with a TV camera. A "scene" is composed of a set of a plurality of cuts in which a predetermined object is picked up. It is possible to put a plurality of scenes together under a specific image pickup theme. The video source can be arranged as such a hierarchical structure of information as a plurality of cuts, scenes putting several cuts together, and a motion picture having an image pickup theme (or a title) putting several scenes together. A specifying number is assigned to the cut and the scene, respectively. The number of the layers in the hierarchical structure may be increased by extending the concept of a scene with using a subset such as a chapter.

Figure 9:
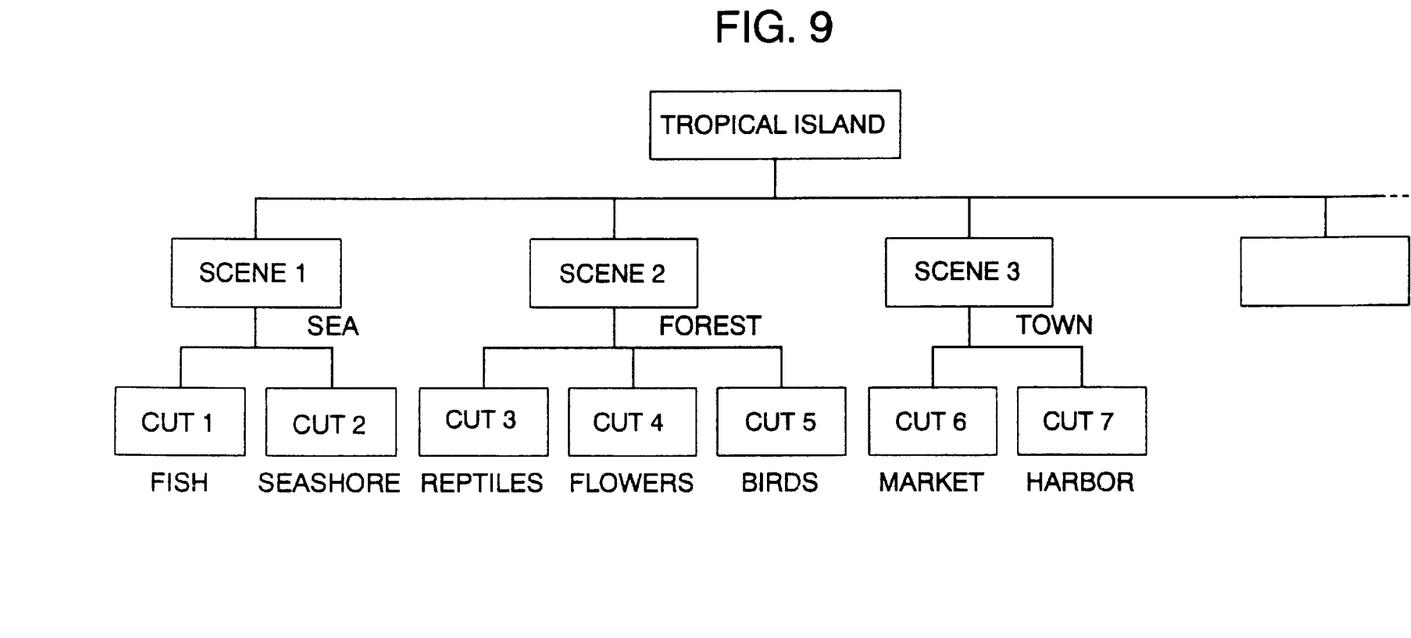
FIG. 9 is a diagram showing an example of a tree-form hierarchical structure of moving image information.

FIG. 9 shows an example of a tree-form hierarchical structure of a recorded image source. The image pickup theme is "Tropical Island". The recorded image source includes a Cut 1 in which fishes in the sea around the island are picked up, a Cut 2 in which a coastal landscape is picked up, a Cut 3 in which the reptiles inhabiting a forest are picked up, a Cut 4 in which flowers are picked up, a Cut 5 in which birds are picked up, a Cut 6 in which a market view is picked up and a Cut 7 in which a harbor is picked up. The Cut 1 is composed of a first frame to a 90th frame for instance, and the Cut 2 is composed of a 91st frame to a 150th frame. The images of the Cut 1 and the Cut 2 are put together as a Scene 1 in which the picked up object is an image of sea. The Cuts 3, 4 and 5 are put together as a Scene 2 in which the picked up object is a forest. The Cuts 6 and 7 are put together as a Scene 3 in which the picked up object is a town view.

In an editing apparatus according to an embodiment of the present invention which will be described in detail later, it is possible to display a part or the whole of this hierarchical structure on a monitor screen for editing. It is possible to optionally designate which part of the hierarchical structure is to be displayed. On the screen to display the hierarchical structure, a representative frame image among those frame images that constitute respective cuts and a representative frame image among those frame images that constitute respective scenes are displayed as a reduced still image, respectively. It is possible to display not only a reduced still image, but also character information showing an attribute of a reduced still image on a screen to display a hierarchical structure.

According to the embodiment of the present invention, editing of a moving image can be made easily by changing an original hierarchical structure shown on a screen by a simple operation by an operator. For example, it is possible to change, i.e., to edit the Cut 1, the Cut 3 and the Cut 5 to a hierarchical structure having a lower hierarchy of a new Scene 1 with animals living in the island as the picked up object. When an image in which the hierarchical structure is changed in such a way is reproduced, a motion picture edited in the order of the Cut 1, the Cut 3 and the Cut 5 can be seen. In the editing work using a screen to display a hierarchical structure, replacement or elimination of the cut or addition of another cut and so on is possible easily. Furthermore, the sequence of scenes can also be replaced easily. For example, it is possible to edit so as to constitute a sequence such as the Scene 3, the Scene 1 and the Scene 2. In that case, the sequence of the cuts of the lower hierarchy of a scene is also replaced together.

Figure 1:
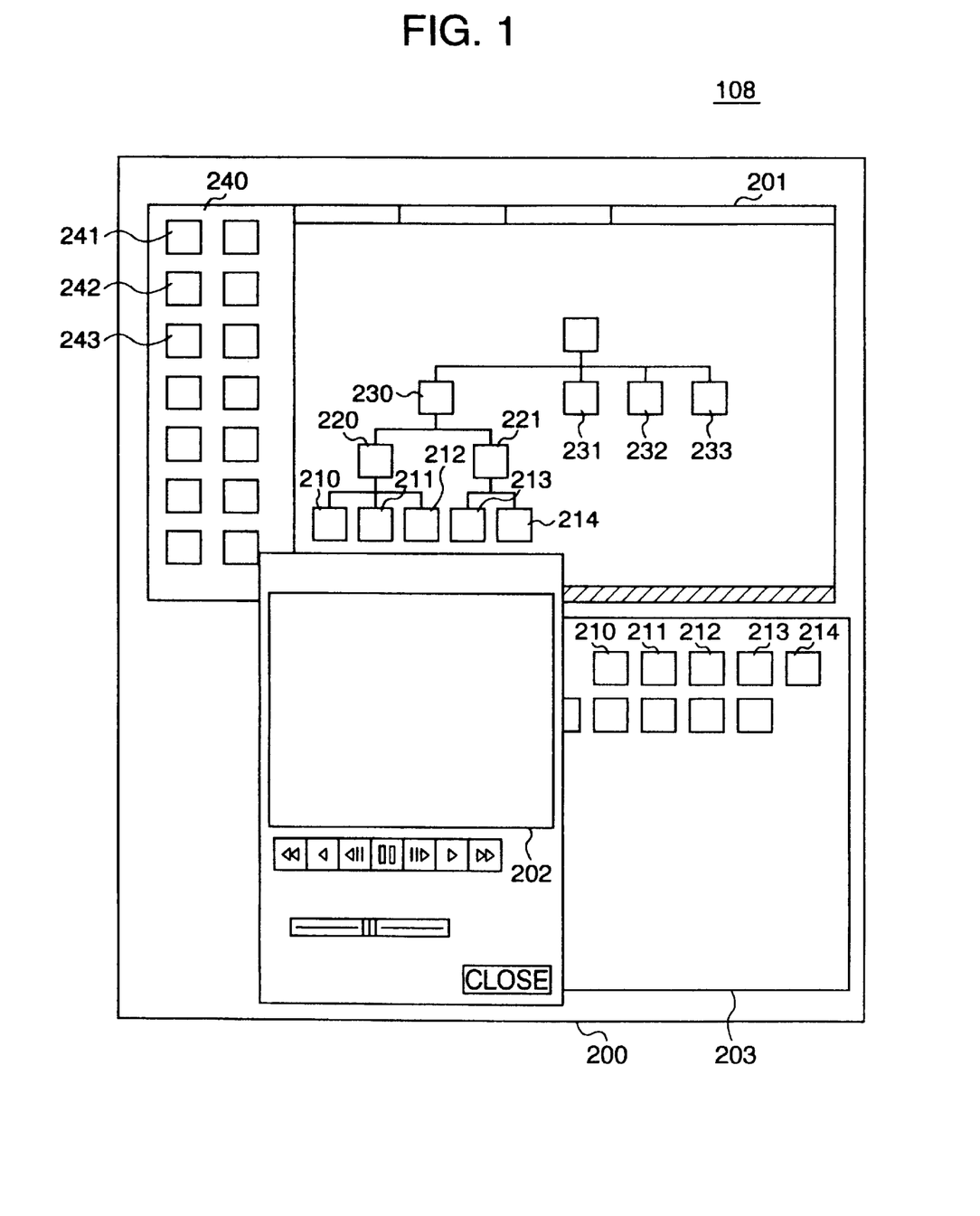
FIG. 1 is a diagram showing an example of monitor screen by an apparatus for editing a moving image according to the present invention.

FIG. 1 shows a monitor screen 200 of an apparatus for editing a moving image according to an embodiment of the present invention. In the figure, a window 201 represents an area for editing. Representative images of cuts 210 to 214 and scenes 220 to 221 constituting moving images of the video source to be edited are displayed on the area for editing 201 in a scale-down size. These scale-down images or reduced images are displayed in a tree-form hierarchical structure.

The window 201 (editing area) for editing further includes an operation key-area 240. The operation key area 240 includes icons 241, 242, 243, . . . of editing function keys for designating various editing operations. It is possible to perform editing by putting a cursor on the editing function key area 240 by operating a mouse and designating a desired key icon. For example, when the key 241 for displaying cut table is designated, a window 203 is displayed on the screen. In the cut table window 203, reduced still images 210 to 214, . . . representing respective cuts are displayed in the time series sequence as a cut table. When a key 242 for reproducing moving image reproduction is designated, and further, when an predetermined cut representative image 210 or a scene representative image 220 is designated, the image of the cut or scene is reproduced on a moving image window 202. A key 243 is a key having a bind function described later. Keys for replacing a cut image or a scene image having a hierarchical structure are also provided. Although the other numerous editing function keys are provided, the description thereof is omitted.

Figure 2:
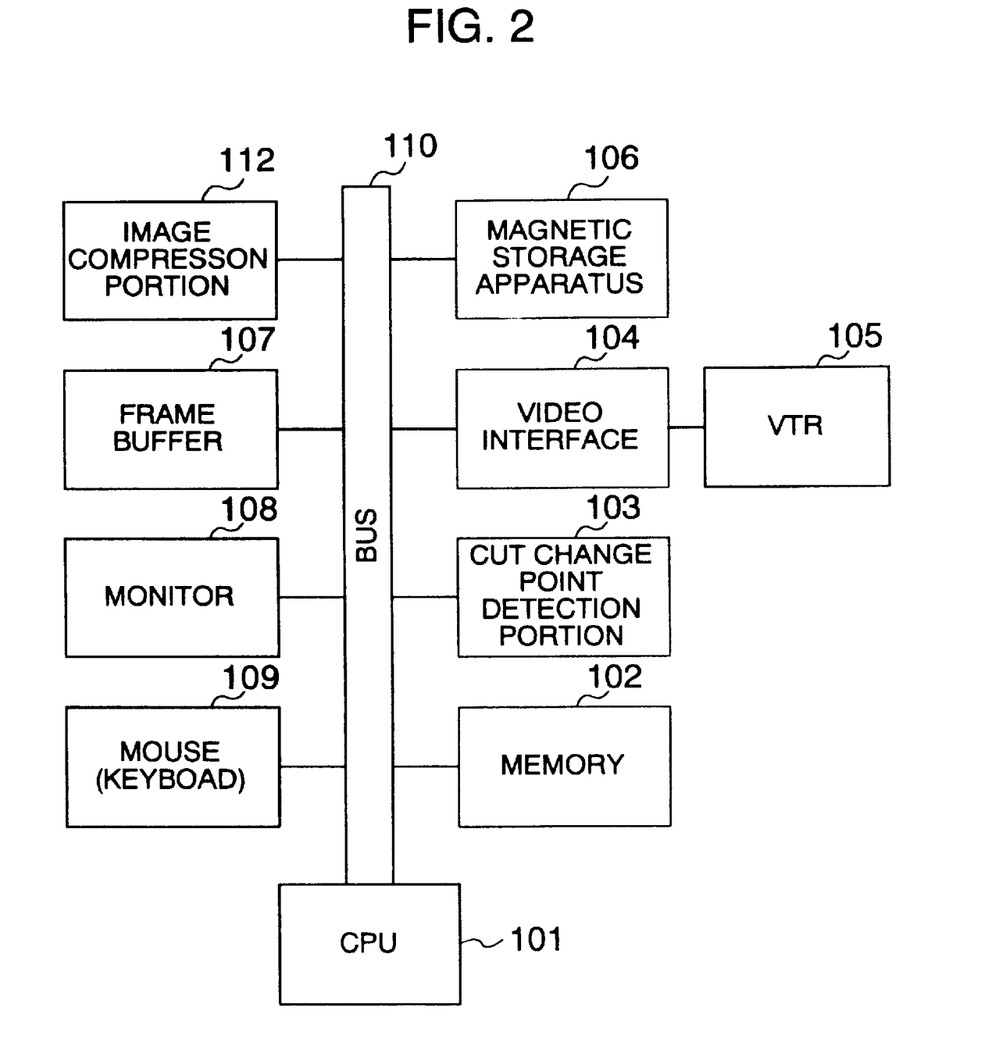
FIG. 2 is a diagram showing a block structural example of an apparatus for editing a moving image.
Figure 3:
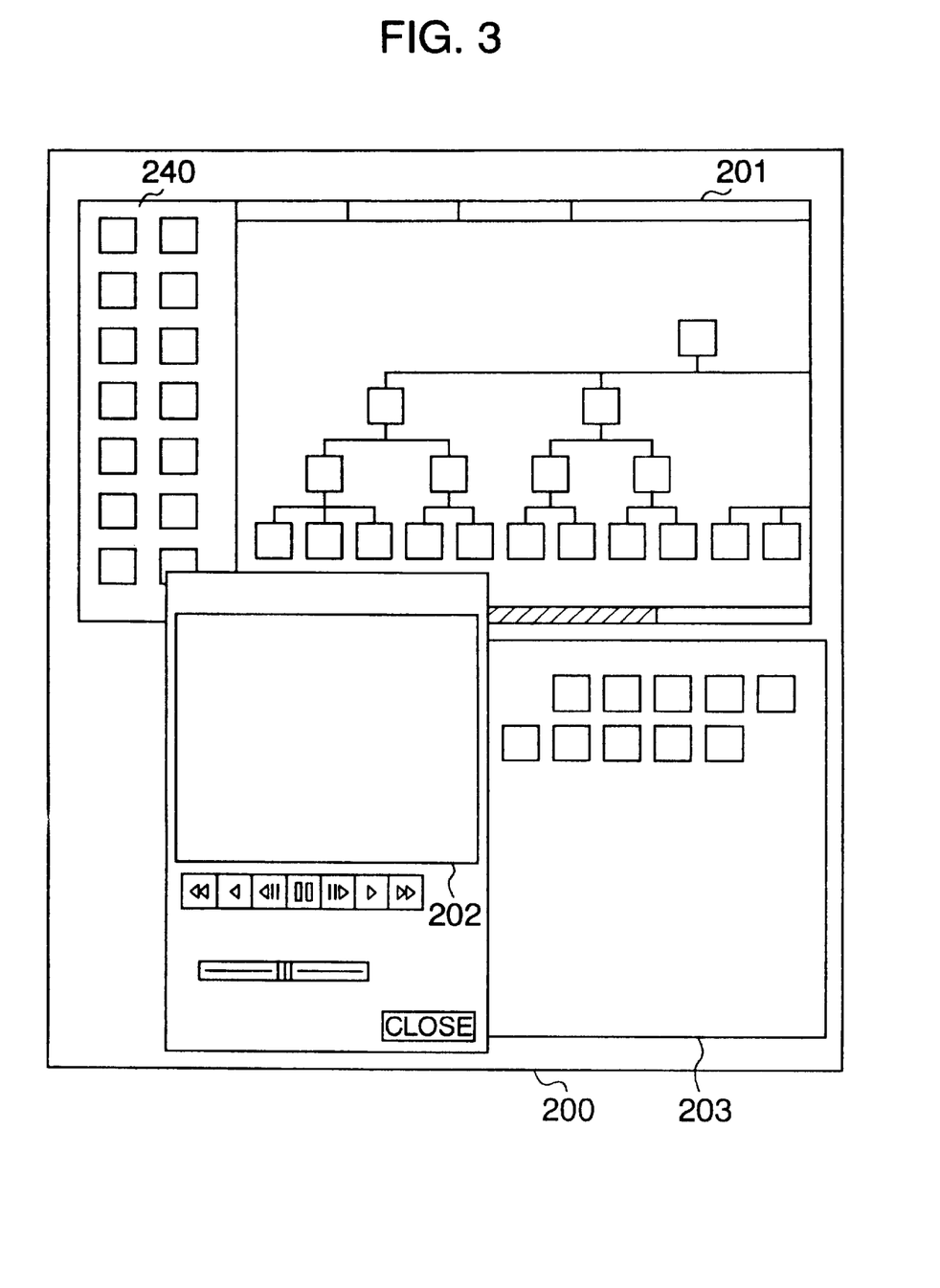
FIG. 3 is a diagram showing an example of monitor screen of a conventional apparatus for editing a moving image.

FIG. 2 is a block diagram of a structural example of an apparatus for editing a moving image. Namely, there are provided a CPU 101 for processing various controls, a monitor 108 for displaying information of a hierarchical structure (a tree structure), showing scenes and cuts used for editing a moving image and indicating an edited state and so on, a memory 102 for storing various control programs of the CPU 101 and so on, a frame buffer 107 for storing images to be displayed on a screen, and a cut change point detection segment 103 for detecting a change point of a series of moving images composed of a plurality of cuts as an input. There is further provided a magnetic storage device 106 for storing a series of moving images, moving image relational information consisting of a frame number and a reduced image display file name in which change points detected in the cut change point detection segment 103 are described, a reduced moving image for high speed display for watching the whole moving image and the scene and so on which are consisted by these plurality of frame images without stretching processing and also reduced to the size displayed as representative image and hierarchical structure management information consisting of a hierarchical number showing what number of the hierarchy each of the plurality of scenes or cuts is located, a reduced image display file name, a cut number attached serially from a first cut for each cut consisting of a plurality of frames, and identifiers showing whether to display on a monitor 108 displaying a hierarchical structure or not. Furthermore, there are provided a video interface 104 for receiving a video signal from a VTR 105 and converting it into a format for handling a moving image with this apparatus, a mouse or a keyboard 109 as input means, and an image compressing segment 112 for compressing the image information inputted from the VTR 105 via the video interface 104 to produce the compressed image data, and expanding the compressed image data to reproduce the image information.

The above-mentioned CPU 101 is connected to a bus 110. And memory 102, cut change point detection segment 103, video interface 104, magnetic storage device 106, frame buffer 107 and image compressing segment 112 are also connected to a bus 110, and are controlled by the access from the CPU 101. The other storage medium may be used or a remote file through a network (such as a network using LAN, RS-232C interface) may be used in place of the magnetic storage device 106.

With the apparatus described above, it is possible to store moving image information in a hierarchical structure and manage the same, to find out required scenes and cuts easily, and moreover, to perform editing with a scene or a cut as the unit easily, to perform division in the unit of cut automatically, and to remove the burden of a user.

Next, the operation in such a structure will be described. First, by the instruction of a mouse or a keyboard 109, registrating operation of the moving image information reproduced from a video tape set in a VTR 105 and compressed in the image compressing segment 112 to the magnetic storage device 106 is instructed. Then, along with the registering operation, moving image information is supplied to the cut change point detection segment 103 through the video interface 104 and the bus 110. In the cut change point detection segment 103, the cut change point is detected in the moving image information after, for example coding the inputted moving image information.

Figure 4:
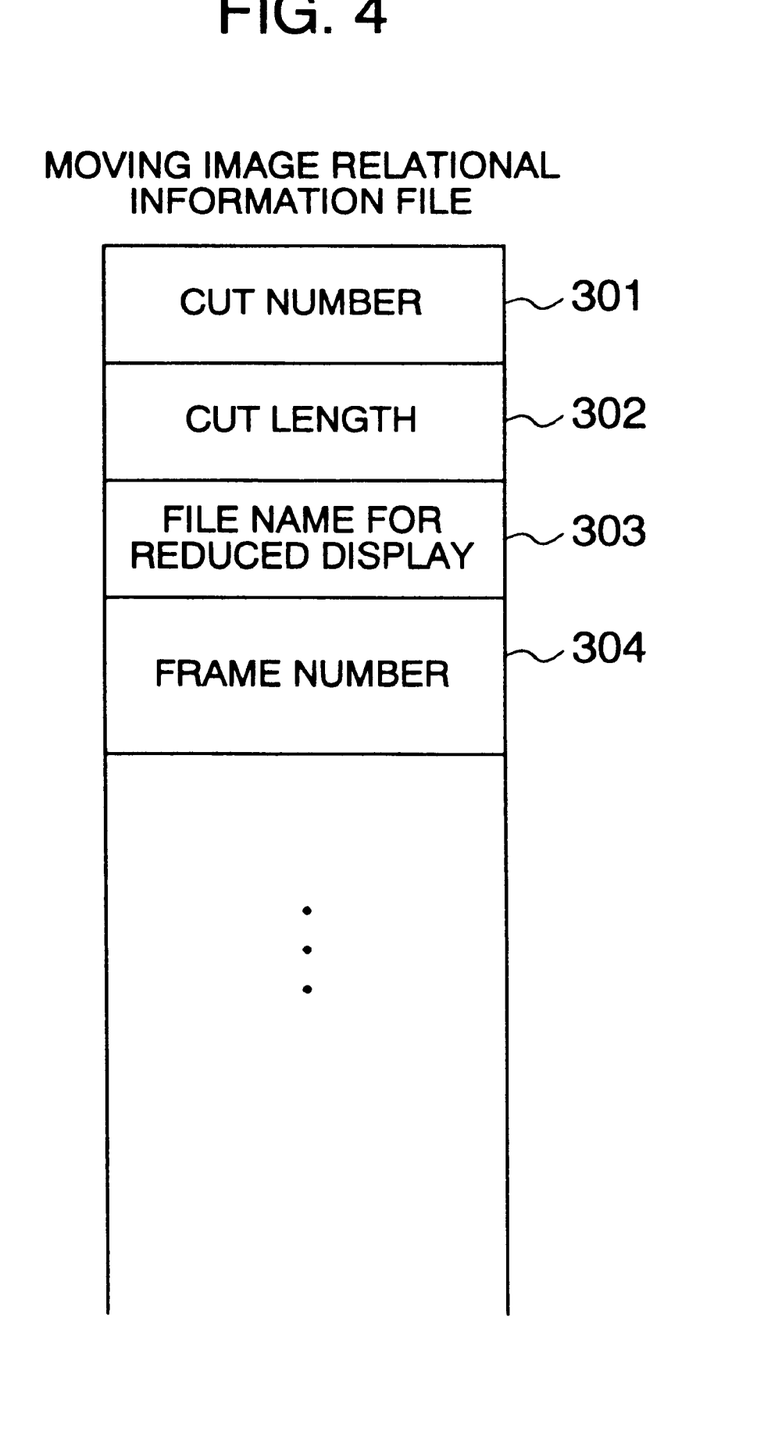
FIG. 4 is a diagram showing a structural example of a moving image information file.

When a cut change point is decided and the sectioning of the cuts is determined, data of moving image relational information files corresponding to each cut at sectioned with the cut change point as shown in FIG. 4 are generated and stored in the magnetic storage device 106. In a cut number slot 301 of the moving image relational information file, the cut number of that cut is held, in a cut length slot 302, a value corresponding to the number of frames included in the cut is held, in a reduced image display file name slot 303, an almost peculiar cut title corresponding to the cut is held, and, in a frame number slot 304, the frame number of a frame image, for example at the head of the cut is held. In this case, since the whole moving image or the scene consisting of a plurality of frames is seen at a high speed, reduced images are stored in the magnetic storage device 106 as a moving image reduced to the size displayed at a high speed as a high speed display image and displayed as a representative image.

In order to take out a predetermined frame image from coded moving image information, decoding and expansion are required, which requires processing time with the CPU 101. However, when uncoded moving image information which is image information reduced for high-speed display is stored in advance as the present embodiment, it is possible to read out the frame image without processing time required for decoding.

An operator instructs to read out a moving image registered in the magnetic storage device 106 by means of a mouse or a keyboard 109. Then, the CPU 101 reads only the first frame of each cut as the change point of the cut of the corresponding moving image, and displays the cut table window 203 of a screen 200 displayed in a monitor 108 as shown in FIG. 1. Corresponding to this display, the operator decides whether the change point of the cut is correct or not. The operator now indicates delimiter of the cuts and now changes the delimiter of the cut by means of the mouse or the keyboard 109.

The CPU 101 affixes a cut number in every cut delimited with the cut change point of the moving image stored in the magnetic storage device 106. Further, when it is indicated that the cut change point of is not correct, the CPU 101 registers another moving image information of the magnetic storage device 106.

Further, when moving image editing or the like is instructed by an operator with the mouse or the keyboard 109, hierarchical structure management information corresponding thereto is read out from the magnetic storage device 106 or the memory 102, edit of the information is made on the screen, and the hierarchical structure completed with editing is registered in the magnetic storage device 106 again.

Figure 6A:
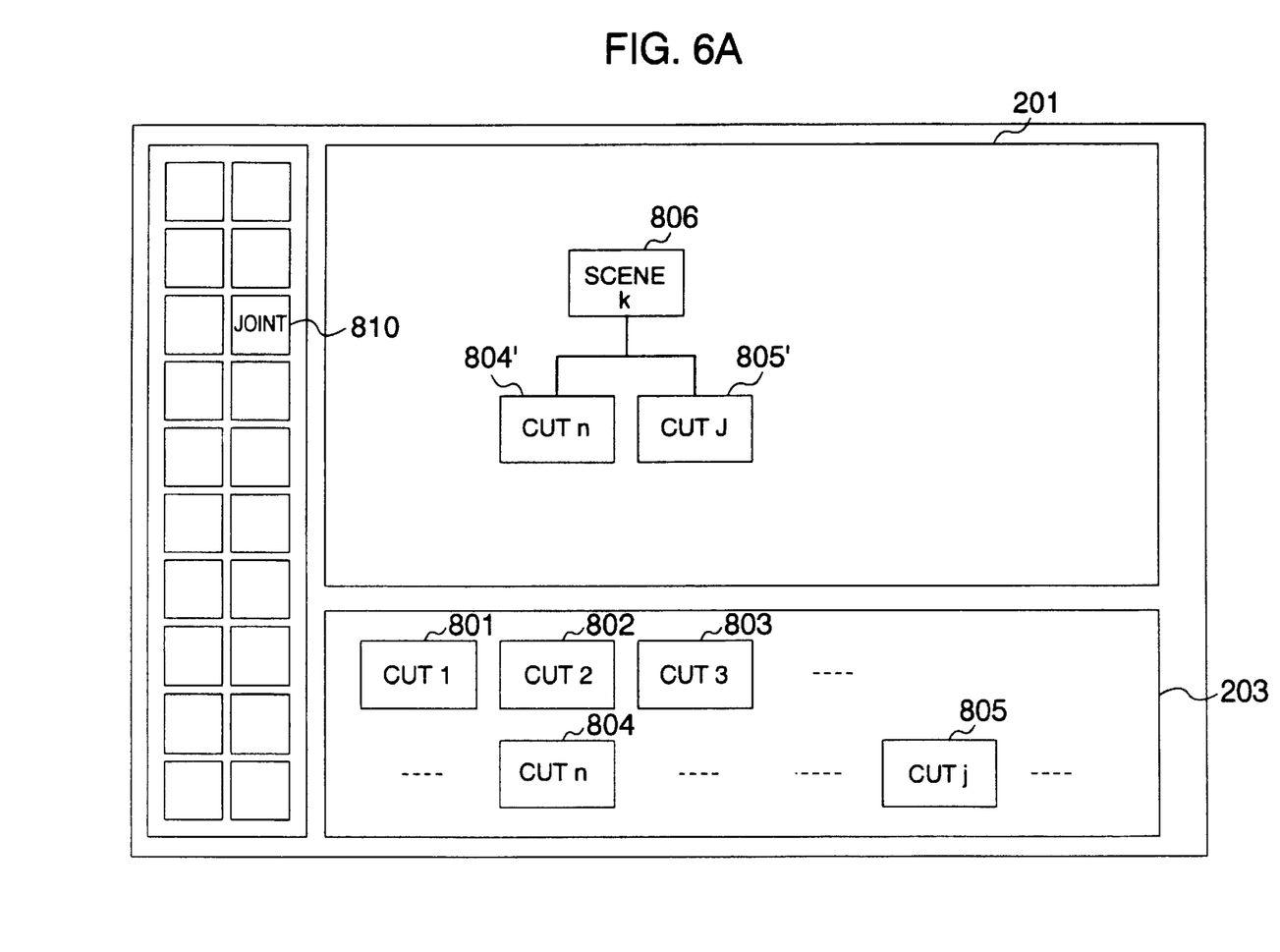
FIGS. 6A, 6B and 6C are diagrams for explaining examples of hierarchical structure display of moving image information by a combination of representative images.
Figure 6B:
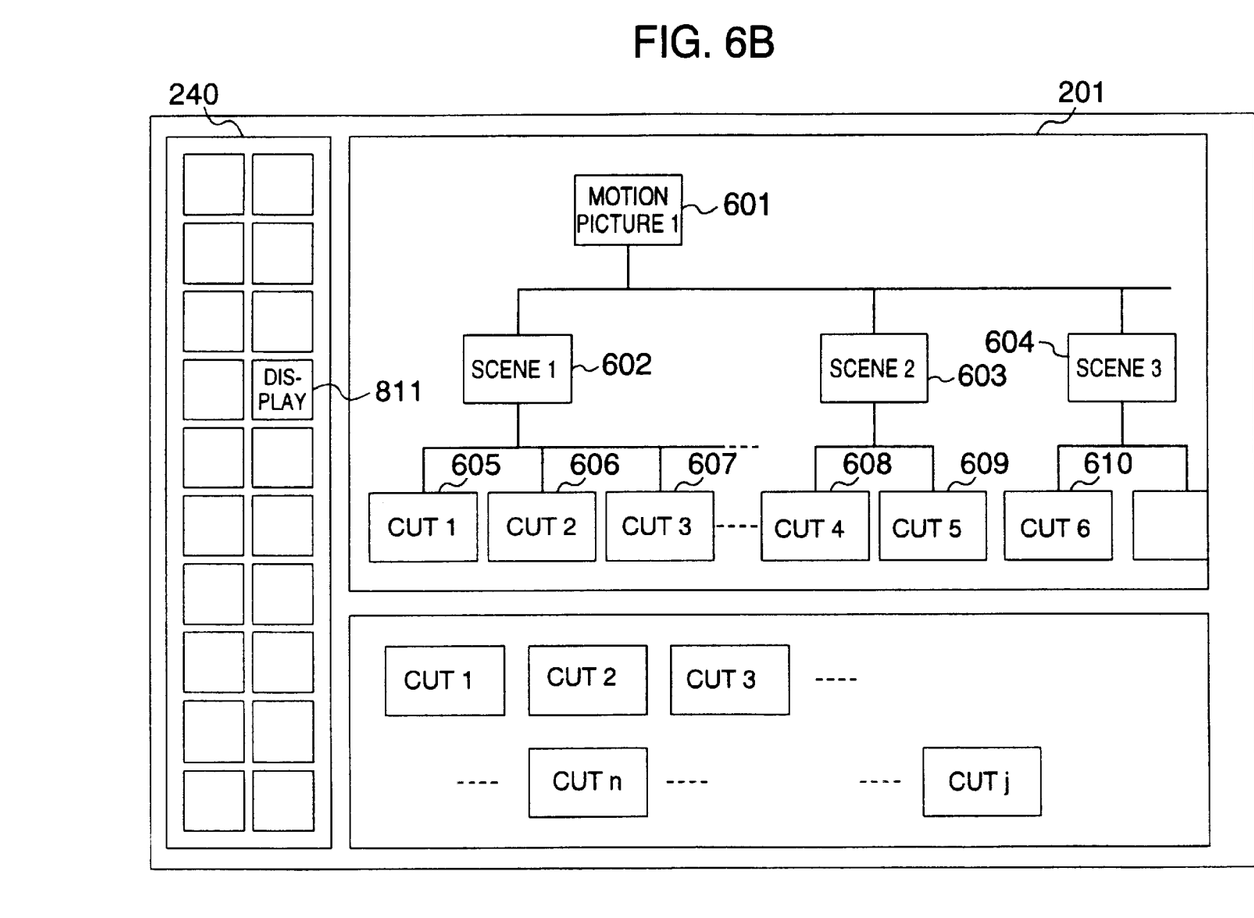
Figure 6C:
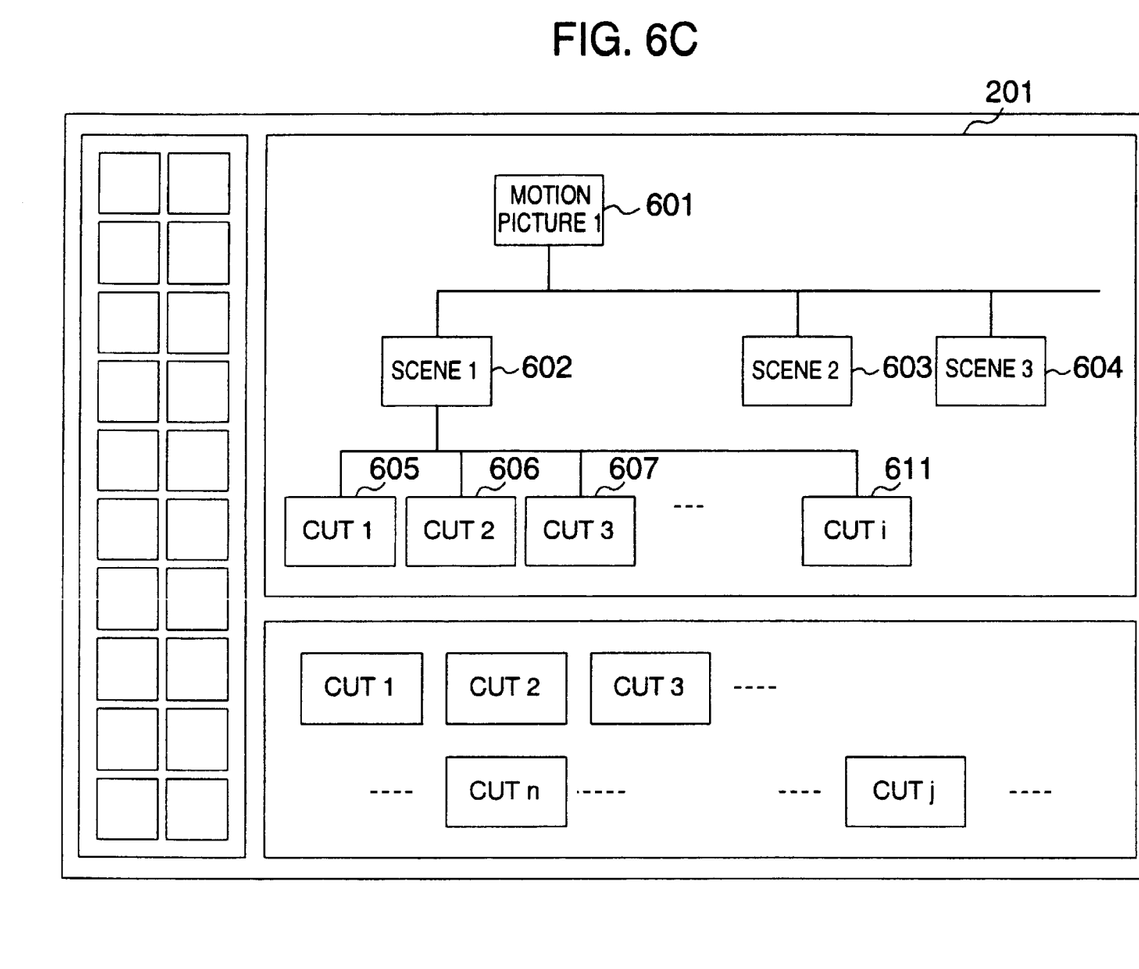

A process of editing a moving image using a hierarchical structure will be described hereinafter with reference to FIGS. 6A, 6B and 6C. FIGS. 6A, 6B and 6C show screens of only the window 201 as the editing area shown in FIG. 1.

For example, reduced still images 801, 802, 803, 804, 805 or the like corresponding to each of moving image information (Cut 1, Cut 2, Cut 3, . . . , Cut n, . . . , Cut j, . . . ) stored in the magnetic storage device 106 are displayed in an arrangement in a raw material area 203 as shown in FIG. 6A in the sequence of storage. Besides, in the case of before starting editing, the reduced still image is not displayed in the editing area 201.

When the editing is started and an operator selects a reduced still image 804 of the Cut n and a reduced still image 805 of the Cut j displayed in the raw material area 203 by means of the mouse or the keyboard 109 and clicks a "junction" key 810 selectively when these images are in a selected state, reduced still images 804' and 805' corresponding to the Cut n and the Cut j, respectively, are newly displayed as shown in FIG. 6A in the editing area 201 where reduced still images have not been displayed until starting editing. Furthermore, a reduced still image 806 corresponding to a scene (a Scene k) composed of the Cut n and the Cut j is displayed, a connection made to show a related state of these three reduced still images 804', 805' and 806 is displayed at the same time, and a diagram showing a tree structure thereof can be displayed quickly with simple operationality.

At this time, a hierarchical structure management information file consisting of a picture management information file, a scene management information file and a cut image information file corresponding to newly displayed tree structure display described above such as shown in FIG. 5 is generated. In this case, the number of the hierarchy where the Scene k is positioned such as "1" is held in a hierarchical number slot 321 among the slots of the scene management information file, a scene number corresponding to the Scene k such as "k" is held in a scene number slot 322, and one of the cuts which becomes a member positioned in the lower hierarchy of the Scene k such as a cut number "n" corresponding to the Cut n is held in a cut number 1 slot 324 which becomes a member. Similarly, a cut which becomes a member positioned in the lower hierarchy of the Scene k such as a cut number "j" corresponding to the Cut j is held in a cut number 2 slot 325 which becomes a member. In this case, since the number of cuts positioned in the lower hierarchy of the Scene k is 2, data are not held in a cut number 3 slot 326 which becomes a member, but the slot 326 is empty. Furthermore, coordinates information for determining a display position of the reduced still image 806 corresponding to the Scene k and in a displaying position in accordance with the editing area 201 is held in an icon display coordinates slot 327, and information for identifying whether the reduced still image 806 is to be displayed in the editing area 201 or not such as information "to display" is held in a display identifier slot 328.

Figure 5:
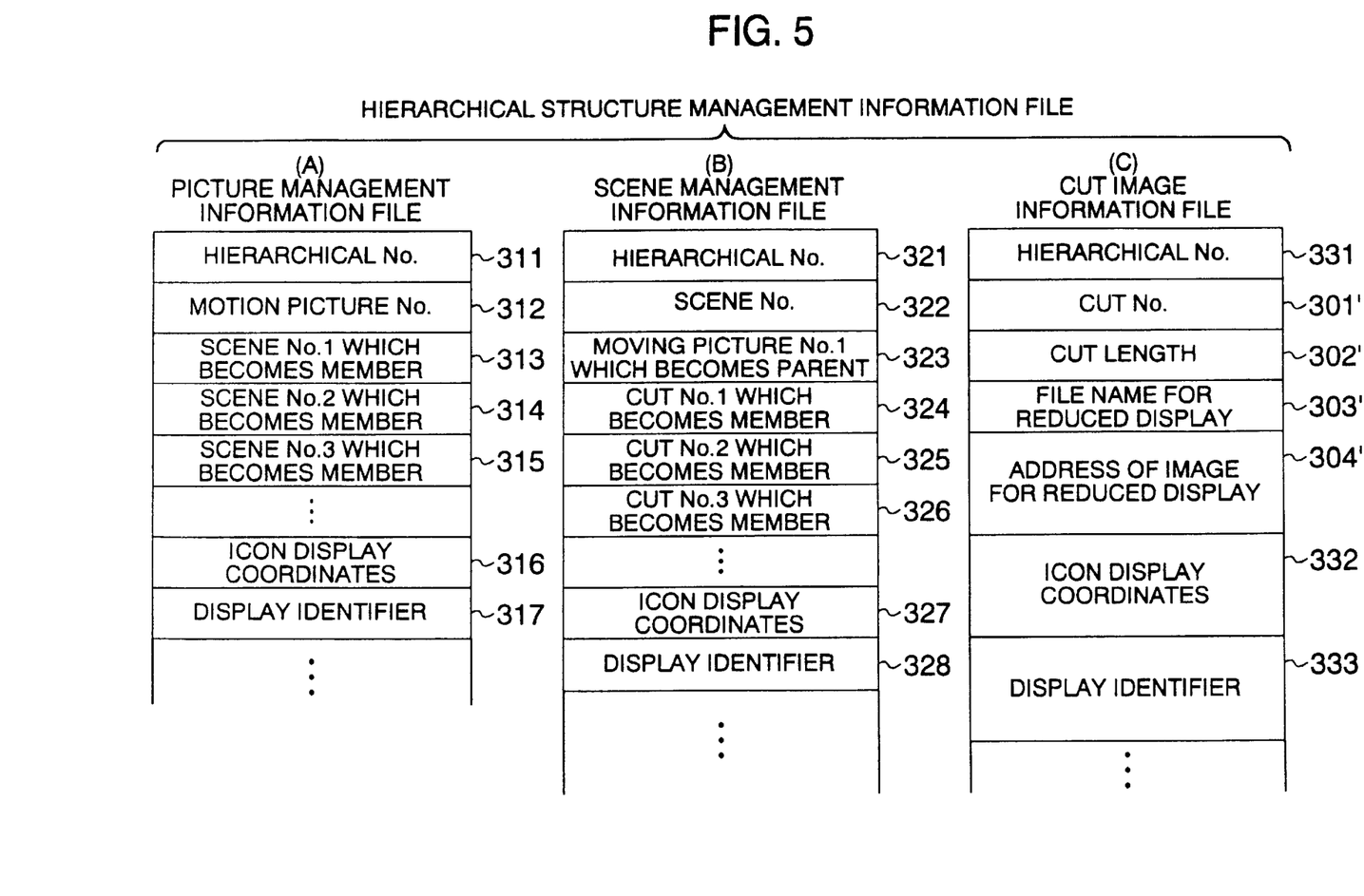
FIG. 5 is a diagram showing a structural example of a hierarchical structure management information file for managing a hierarchical structure of moving image information.

Furthermore, cut image information files corresponding to the Cut n and the Cut j are generated as a cut image information file among hierarchical structure management information files. Among the slots of cut image information files corresponding to the Cut n, the number of the hierarchy where the Cut n is positioned such as "2" is held in a hierarchical number slot 331, a cut number corresponding to the Cut n such as "n" is held in a cut number slot 301', and a value corresponding to the number of frames of the Cut n is held in a cut length slot 302'. Furthermore, an almost peculiar file title corresponding to the contents of the Cut n is held in reduced image display file name slot 303', and a frame number of a frame image, for example at the head of the Cut n is held in a frame number slot 304'. Furthermore, coordinates information for determining a display position of a reduced still image 804' corresponding to the Cut n in accordance with the editing area 201 is held in an icon display coordinates slot 332, and information for identifying whether the reduced still image 804' is to be displayed in the editing area 201 or not such as information "to display" is held in a display identifier slot 333.

Besides, predetermined information is held similarly to the foregoing in several of the slots of the cut image information file corresponding to the Cut j different from the above, but description thereof is omitted here.

Furthermore, a motion picture image constituted from a plurality of scenes displayed in the editing area 201 such as a motion picture 1 is generated as an upper hierarchy of those respective scenes, and reduced still image corresponding to the motion picture 1 is connected to reduced still images corresponding to respective scenes and displayed. The state of the tree structure is shown in FIG. 6B. A hierarchical structure management information file such as shown in FIG. 5 described above is generated in accordance with the hierarchical structure display. The number of the hierarchy where the motion picture 1 is positioned such as "1" is held in a hierarchical number slot 311 among the slots in the picture management information file of the hierarchical structure management information file.

At this time, in the hierarchical number slots of the scene management information files in accordance with the Scene 1, the Scene 2 and the Scene 3 in the lower hierarchy of the motion picture 1, respectively, the number is revised to a value which is a hierarchical number showing to be the lower hierarchy right under the motion picture 1 is held, and "2" is held for example. Furthermore, at this time, in the hierarchical number slots of the cut management information file in accordance with each of the Cut 1, the Cut 2, the Cut 3, the Cut 4 and the Cut 5 in respective lower hierarchies of the Scene 1, the Scene 2 and the Scene 3, the numbers are held after being revised to the values that are hierarchical numbers showing to be lower hierarchies right under the Scene 1, the Scene 2 and the Scene 3, respectively, and "3" is held for example.

Furthermore, a motion picture number corresponding to the motion picture 1 such as "1" is held in a motion picture number slot 312 among the slots in the picture management information file. Furthermore, a scene number corresponding to one of the scenes that become members located in the lower hierarchy of the motion picture 1 such as a scene number "1" corresponding to the Scene 1 is held in a scene number 1 slot 313 which becomes a member. Similarly, a scene number corresponding to a scene which becomes a member located in the lower hierarchy of the motion picture 1 such as a scene number "2" corresponding to the Scene 2 is held in a scene number 2 slot 314 which becomes a member, and a scene number corresponding to a scene which becomes a member located in the lower hierarchy of the motion picture 1 such as a scene number "3" corresponding to the Scene 3 is held in a scene number 3 slot 315 which becomes a member. Furthermore, coordinates information for determining a display position of a reduced still image 601 corresponding to the motion picture 1 in accordance with the editing area 201 are held in an icon display coordinates slot 316, and information for identifying whether the reduced still image 601 is to be displayed in the editing area 201 or not such as information "to display" is held in a display identifier slot 317.

As described above, a plurality of reduced still images corresponding to scenes, cuts and the motion picture in respective hierarchies are displayed in the editing area 201 as shown in FIG. 6B. Since the size of the editing area 201 which can be displayed is restricted, however, it is conceived to display only the cuts in the lower hierarchy of the selected scene, and selective display switching is realized by means of the operation described hereunder in the present invention.

Namely, an operator selects one of the reduced still images corresponding to respective scenes displayed in the editing area 201 with the mouse or the keyboard 109. When a "display" key 811 is clicked selectively in case the reduced still image is in a selection state, reduced still images corresponding to the cuts positioned in the lower hierarchy of the scenes where the reduced still images are selected are displayed as they are, and reduced still images corresponding to the cuts positioned in the lower hierarchy of the scenes other than the scenes where the reduced still images are selected become no longer displayed. A change-over of setting whether the reduced still image is to be displayed or not is performed by rewriting the held information in display identifier slots of respective cut image information files corresponding to the cuts not to display in the above-explained hierarchical structure management information file from a value "to display" to a value "not to display". It is possible to be performed by rewriting the held information for not only cuts but also scenes.

As a concrete case, the operation when the reduced still images corresponding to the cuts at the Scene 1 and thereafter shown in FIG. 6B are displayed and the reduced still images corresponding to the cuts of the scenes other than the Scene 1 such as the cuts at the Scene 2, the Scene 3 and thereafter are not displayed will be explained.

The operator selects a reduced still image 601 corresponding to the Scene 1 displayed in the editing area 201 shown in FIG. 6B with the mouse or the keyboard 109.

When the "display" key 811 is clicked selectively in case the reduced still image 601 is in a selected state, as to the reduced still image displayed in the editing area 201, the reduced still images corresponding to the motion picture 1, the Scene 1, the Scene 2 and the Scene 3 displayed in FIG. 6B are kept as they are displayed, and similarly, the reduced still images corresponding to the Cut 1, the Cut 2 and the Cut 3 positioned in the lower hierarchy of the Scene 1 are kept as they are displayed. The reduced still images corresponding to the other Cut 4, Cut 5 and Cut 6 that have been displayed in FIG. 6B are not displayed in FIG. 6C.

In this case, scene management information files of the scenes other than the selected scene, i.e., the scenes other than the Scene 1 are referred to sequentially using the hierarchical structure management information file. For example, information held in the cut number 1 slot 323 which becomes a member and in the cut number 2 slot 324 which becomes a member in the scene management information file of the Scene 2, i.e., the cut numbers of the Cut 4 and the Cut 5 are read out respectively. Further, the cut image information file of the cuts in the lower hierarchy of the Scene 2 is referred to on the basis of the cut numbers which have been held in respective slots and read out therefrom, and the values of respective display identifier slots of the cut image information file corresponding to the Cut 4 and the cut image information file corresponding to the Cut 5 are set to "not to display". Similarly, the similar processing to the above is performed with respect to the scene management information file of the Scene 3.

Although the tree hierarchical structure has been described as a three-layer structure in the above description, it is possible to display only the reduced still images at the selected reduced still image or thereafter among a plurality of reduced still images at a desired level by setting the values of the display identifier slots of the lower hierarchy with similar operation even when the number of layers is more than three layers.

Further, the display position for the reduced still images on the screen can be changed in the embodiment of the present invention. The process of changing the display position will be explained below.

The changing of the display position of the reduced still image is performed by rewriting the held information in the icon display coordinates slots of respective scene management information file or the cut image information file corresponding to the objective scenes or cuts in the above-mentioned hierarchical structure management information file into the value of a predetermined coordinate information.

As the concrete example, as similar to above-mentioned case, we will explain the operation by referring to a case that reduced still images corresponding to cuts at the Scene 1 and thereafter shown in FIG. 6B are displayed and while reduced still images corresponding to cuts of the scenes other than Scene 1 such as the cuts at the Scene 2, the Scene 3 and thereafter are not displayed.

The operator selects a reduced still image 601 corresponding to Scene 1 displayed in the editing area 201 shown in FIG. 6B with operating the mouse or the keyboard 109. When the "display" key 811 is clicked selectively in a selected state, as to the reduced still image displayed in the editing area 201, the reduced still images corresponding to the motion picture 1, Scene 1, Scene 2 and Scene 3 displayed in the screen of FIG. 6B are kept as they are displayed, and the displayed positions are changed, that is for example the distances between adjacent reduced still images corresponding to the Scene 1, Scene 2 and Scene 3 on the screen are shortened. Further, the reduced still images corresponding to the Cut 1, Cut 2, Cut 3, . . . and Cut i positioned in the lower hierarchy of the Scene 1 are displayed at the changed positions.

In this case, the scene management information files of the scenes whose corresponding reduced still images are changed in the position on the screen and the cut image information files of the cuts whose corresponding reduced still images are changed in the position on the screen are referred to by using the hierarchical structure management file. And then, the values of the icon display coordinates slot in the scene management information file of e.g. the Scene 2 is set to a value which makes the distance between the adjacent reduced still images corresponding to the Scene 1 and Scene 2 shorten. The same process is also taken for the values of the icon display coordinates slot in the scene management information file related to the other scenes or the cut image information file related to the cuts.

Figure 7A:
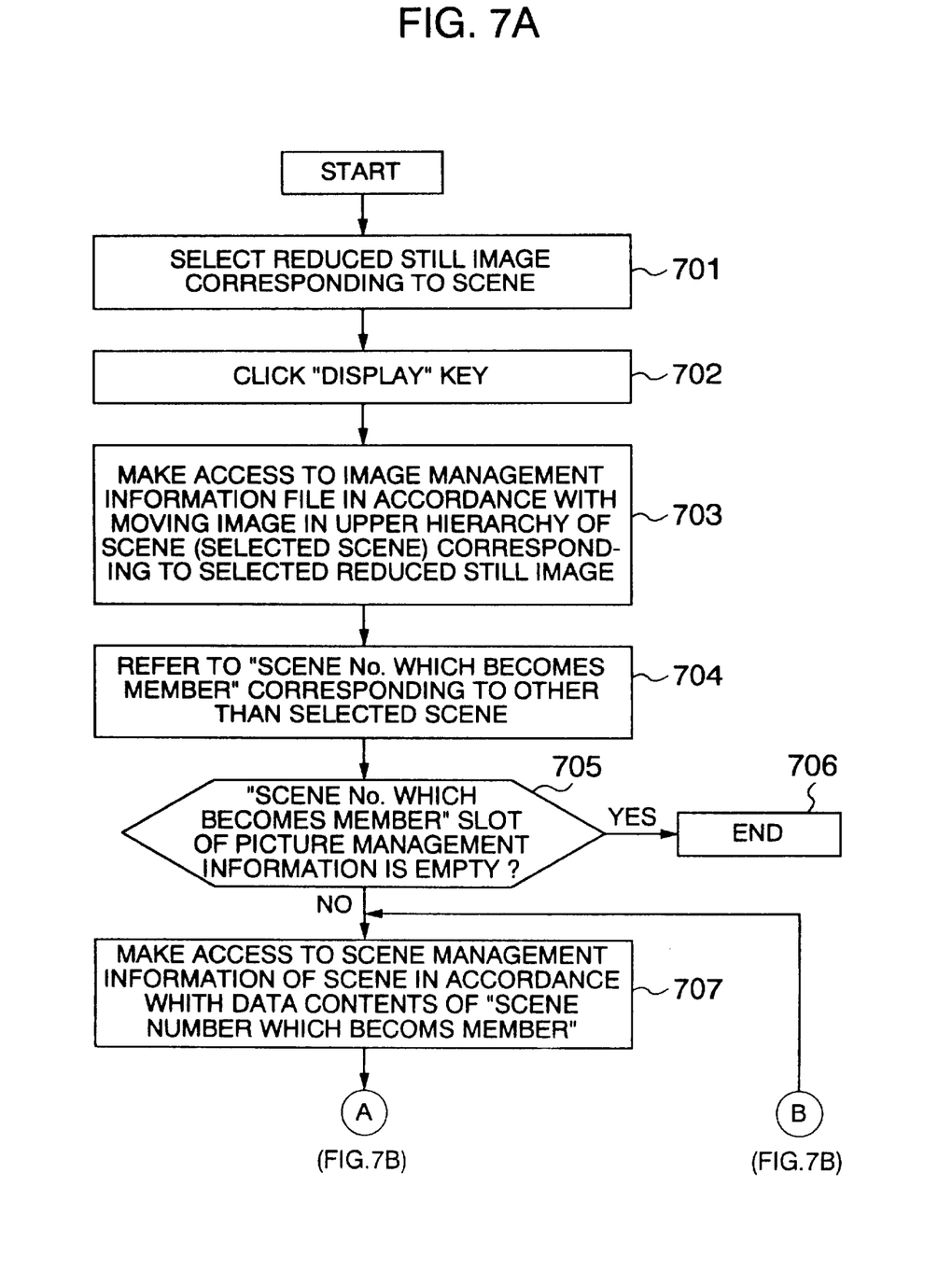
FIGS. 7A and 7B show a flow chart of processing in case only a part of a hierarchical structure is displayed on a monitor screen in an editing method of an embodiment of the present invention.
Figure 7B:
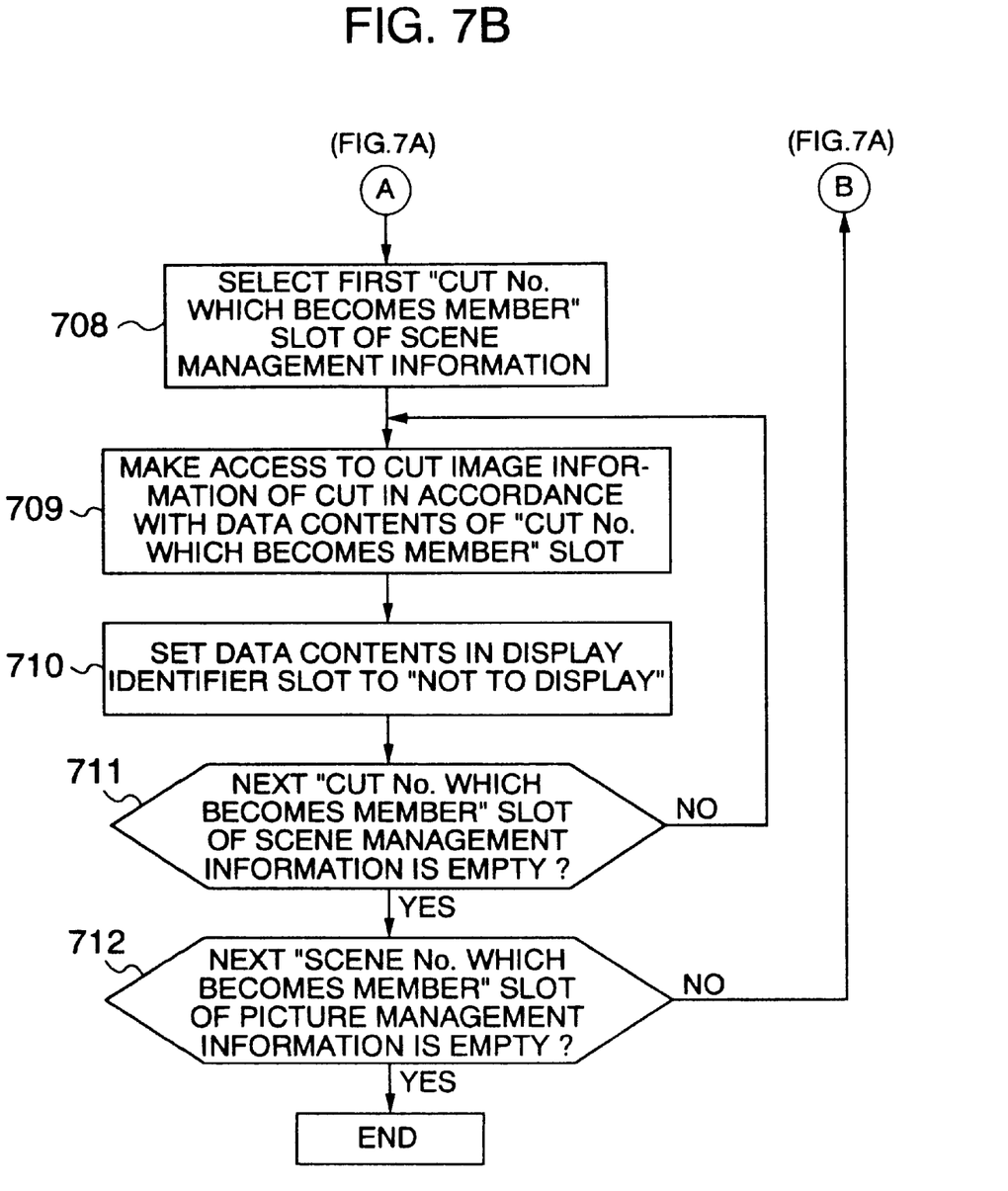

A processing flow chart when only a part of hierarchical structure designated by an operator is displayed is shown in FIGS. 7A and 7B.

In a step 701, a reduced still image corresponding to a scene is selected. In a step 702, the "display" key 811 in an icon 240 is clicked. In a step 703, access is made to the picture management information file (FIG. 5-(A)) in accordance with a motion picture in the upper hierarchy of the scene (selected scene) corresponding to the selected reduced still images. In a step 704, "a scene number which becomes a member" corresponding to other than the selected scenes in the file is referred to. In a step 705, it is determined whether the slot of "the scene number which becomes a member" of the picture management information file is empty or not. If the slot is empty, the processing is completed in a step 706. If the slot is not empty, access is made to the scene management information file (FIG. 5-(B)) of the scene in accordance with the data contents of "the scene number which becomes a member" in a step 707. In a step 708, a slot of the first "cut number which becomes a member" of the scene management information file is selected. In a step 709, access is made to the cut image information file (FIG. 5-(C)) of the cut in accordance with the data contents of the slot of "the cut number which becomes a member". In a step 710, the data contents of the slot of the display identifier are set to "not to display". In a step 711, it is determined whether the slot of the second "cut number which becomes a member" in the scene management information file (FIG. 5-(B)) is empty or not. If the slot is not empty, the processing is returned to the step 709. In a step 712, it is determined whether the slot of the second "scene number which becomes a member" of the picture management information file (FIG. 5-(A)) is empty or not. If the slot is empty, the processing is completed, and if the slot is not empty, the processing is returned to the step 707.

As described above, according to the present invention, it is possible to grasp the edited video contents quickly by arranging so that, when reduced still images corresponding to scenes and cuts constituting a motion picture are displayed in accordance with a hierarchical structure, all of representative images of the whole hierarchical structure are not displayed with scrolling, but only reduced still images corresponding to the scenes or the cuts that belong to the scenes of the selected hierarchy or thereafter are displayed with respect to the scenes and the cuts in a predetermined hierarchy or thereafter.

According to the present invention described above, instead of displaying the reduced still images corresponding to the motion picture, scenes and cuts, the reduced moving images corresponding to the motion picture, scenes and cuts can also be displayed on the screen selectively.

What is claimed is:

1. A method of editing moving images comprising:
   inputting said moving images, said moving images including a plurality of scenes, each scene including a plurality of cuts and each cut including a plurality of frames;
   detecting change portions of said moving images and dividing said moving images into said scenes and cuts;
   selecting a still image representing each of said scenes and cuts;
   storing position information with respect to said change portions of said moving images and said representative still images of said scenes and cuts;

designating said representative still images of said scenes and cuts to edit said moving images;

determining a hierarchical structure, said hierarchical structure including at least a plurality of said representative still images of said scenes and said representative still images of said cuts relating to at least one scene selected from said scenes; and displaying an entire image of said hierarchical structure on a screen, whereby said hierarchical structure is changed in accordance with a requirement of an operator.

2. A method of editing moving images according to claim 1, wherein said step for determining said hierarchical structure has a step for generating a hierarchical structure management information file including display identification information for specifying representative still images to be displayed on said screen and information for designating a hierarchical relationship between said cuts and scenes constituting said moving images, and, in said display step, designated representative still images are displayed on a screen as a hierarchical structure based on the information of said hierarchical structure management information file including said display identification information.

3. A method of editing moving images according to claim 2, further comprising:

changing the hierarchical structure management information file by designating the representative still images on said screen showing said hierarchical structure and displaying the changed hierarchical structure on a screen.

4. A method of editing moving images according to claim 1, wherein said hierarchical structure further includes a plurality of frames relating to said selected cuts.

5. A method of editing moving images according to claim 4, further comprising:

changing coordinate positions on said screen of said representative still images displayed with said hierarchical structure so that said representative still images and said frames are displayed within a predetermined screen area.

6. A method of editing moving images according to claim 4, wherein in said step of displaying said hierarchical structure including said designated representative still images, both or either of the image representative frame in the frame images constituting said cuts and scenes and character information showing the contents of said cuts and scenes is displayed in said hierarchical structure.

7. A recording medium for storing program codes read and executed by a computer, comprising:

a first code section for inputting said moving images, said moving images including a plurality of scenes, each scene including a plurality of cuts and each cut including a plurality of frames;

a second code section for detecting change portions of said moving images and dividing said moving images into said scenes and cuts;

a third code section for selecting a still image representing each of said scenes and cuts;

a fourth code section for storing position information with respect to said change portions of said moving images and said representative still images of said scenes and cuts;

a fifth code section for designating said representative still images of said scenes and cuts to edit said moving images;

a sixth code section for determining a hierarchical structure, said hierarchical structure including at least a plurality of said representative still images of said scenes and said representative still images of said cuts relating to at least one scene selected from said scenes; and a seventh code section for displaying an entire image of said hierarchical structure on a screen, whereby said hierarchical structure is changed in accordance with a requirement of an operator.

8. An apparatus for editing moving images comprising:

input means for inputting said moving images, said moving images including a plurality of scenes, each scene including a plurality of cuts and each cut including a plurality of frames;

detecting means for detecting change portions of said moving images and dividing said moving images into said scenes and cuts;

selecting means for selecting a still image representing each of said scenes and cuts;

a memory for storing position information with respect to said change portions of said moving images and said representative still images of said scenes and cuts;

means for designating said representative still images of said scenes and cuts to edit said moving images;

means for determining a hierarchical structure, said hierarchical structure including at least a plurality of said representative still images of said scenes and said representative still images of said cuts relating to at least one scene selected from said scenes;

a display for displaying an entire image of said hierarchical structure on a screen; and a controller for controlling said detection means, said selecting means, said memory, said designating means, said determining means and said display so that said hierarchical structure is changed in accordance with a requirement of an operator.

9. A method of editing moving images comprising:

compressing said moving images and storing compressed moving images into a storage device, said moving images including a plurality of scenes, each scene including a plurality of cuts and each cut comprising a plurality of frames;

detecting change portions of said moving images and dividing said moving images and dividing said moving images into said scenes and cuts;

selecting a still image representing each of said scenes and cuts;

storing position information with respect to said change portions of said moving images and said representative still images of said scenes and cuts;

designating said representative still images of said scenes and cuts to edit said moving images and storing said representative still image of each of said scenes and cuts in a form of a reduced still image;

determining a hierarchical structure, said hierarchical structure including at least a plurality of said representative reduced still images of said scenes and said representative reduced still images of said cuts relating to at least one said scene selected from said scenes; and displaying said reduced still images representing said scenes and cuts designated to edit said moving images in the form of an entire image of said hierarchical structure, wherein said hierarchical structure is changed in accordance with a requirement of an operator.

10. A method of editing moving images according to claim 9, wherein when an operator selects one of said representative reduced still images of said hierarchical structure, lower levels of said hierarchical structure related to said selected representative reduced still image are displayed while said entire image of said hierarchical structure is being displayed.

11. A method of editing moving images according to claim 10, further comprising:

designating one of said reduced still images; and displaying moving images of said scenes and cuts corresponding to said designated reduced still image.

12. An editing apparatus for editing moving images comprising:

a video interface through which said moving images are supplied to the editing apparatus, said moving images including a plurality of scenes, each scene including a plurality of cuts and each cut including a plurality of frames;

a cut point detector, coupled to said video interface which detects change portions of said moving images, divides said moving images into said scenes and cuts and designates a still image representing each of said scenes and cuts;

a storage device which stores compressed image data corresponding to said moving images, change portion information with respect to said change portions of said moving images and a designated still image representing each of said scenes and cuts in the form of a reduced still image;

a processor for determining a hierarchical structure, said hierarchical structure including at least a plurality of said representative reduced still images of said scenes and said representative reduced still images of said cuts relating to at least one scene selected from said scenes;

a monitor which displays an entire image of said hierarchical structure on a screen; and a control unit which controls said video interface, said cut point detector, said storage device, said processor and said monitor so that said hierarchical structure is changed in accordance with a requirement of an operator.

13. An editing apparatus for editing moving images according to claim 12, wherein when an operator selects one of said representative still images of said hierarchical structure, lower levels of said hierarchical structure related to said selected representative still image are displayed while said entire image of said hierarchical structure is being displayed.

* * * * *